May 18, 1965  R. WOODELL  3,183,941
TUBULAR FLUID CONDUIT OF FILM-FIBRIL ELEMENTS
Filed March 16, 1962  3 Sheets-Sheet 1
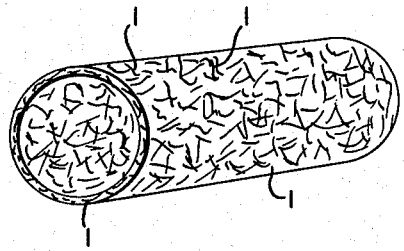
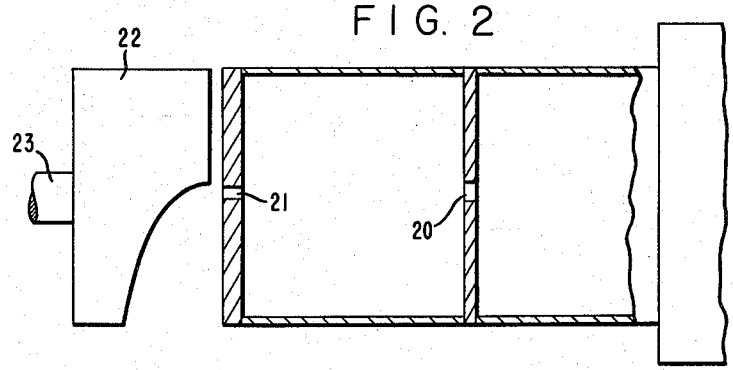
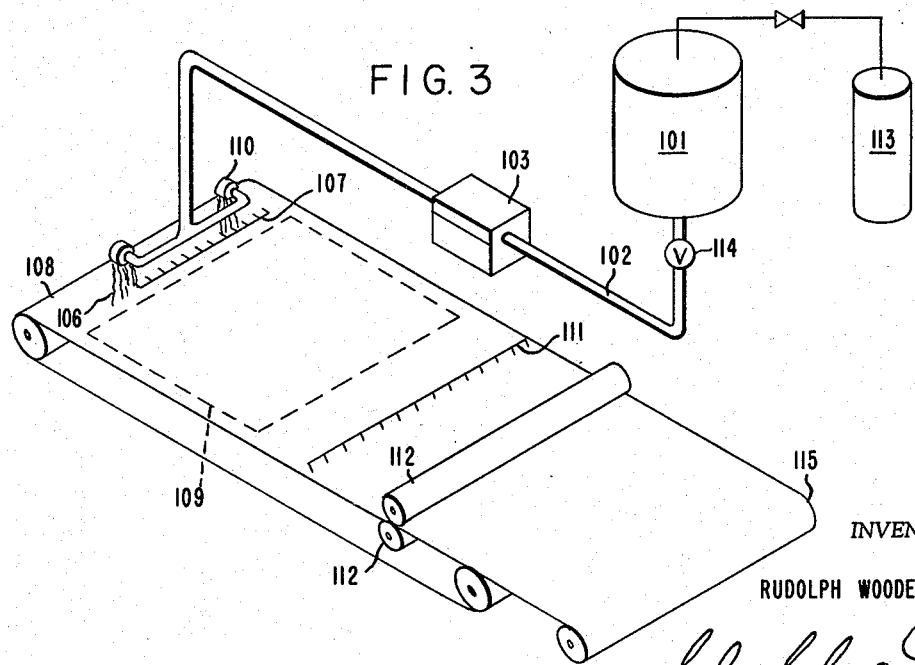
INVENTOR
RUDOLPH WOODELL
BY Sol Schwartz
ATTORNEY May 18, 1965 R. WOODELL 3,183,941
TUBULAR FLUID CONDUIT OF FILM-FIBRIL ELEMENTS
Filed March 16, 1962 3 Sheets-Sheet 3

NON-WOVEN FIBROUS
LAYER OF FILMY MATERIAL

WATER IMPERMEABLE
POLYMERIC LAYER

INVENTOR
RUDOLPH WOODELL

BY
ATTORNEY

3,183,941
TUBULAR FLUID CONDUIT OF FILM FIBRIL ELEMENTS
Rudolph Woodell, Richmond, Va., assignor to E. I. du Pont de Nemours and Company, Wilmington, Del., a corporation of Delaware
Filed Mar. 16, 1962, Ser. No. 180,172
6 Claims. (Cl. 138—141)

This invention relates to fibrous pipes, tubes, ducts, containers or like hollow structures and a method of making same. More particularly it concerns strong tubular structures composed of very thin, oriented film-fibrils of a heat-weldable, thermoplastic resin.

It is well known that certain synthetic plastics or resins are highly desirable as materials for making tubular structures, such as pipe and containers, because of their light weight, resistance to corrosion, water insensitivity and low cost. However, unreinforced plastic pipe and containers are useful only at low pressures, and undergo growth or creep and ultimately fail by bursting at relatively low hoop stresses (circa 3,000 p.s.i.g.). As herein used, hoop stress relates to the actual stress in the pipe wall and is measured by Barlow's approximate formula:

$$HS = PD/2t$$

where $P$ = fluid pressure at burst, lbs./in.$^2$ (gauge), $D$ = outside diameter, inches, $t$ = wall thickness, inches. Harder plastics, such as unplasticized polyvinyl chloride, which yield tubular structures that can withstand higher hoop stresses than soft plastics, such as polyethylene, are brittle and therefore subject to damage and destruction by impact or bending stresses. On the other hand, soft plastic pipe, while less susceptible to mechanical damage, must be used at lower pressures than hard plastic pipe, and being low in rigidity, must be essentially continuously supported in use, which leads to high installation costs for overhead piping.

It is also well known in the art, that to overcome the deficiencies of unreinforced plastic tubular structures such as pipes and tanks, the plastic is reinforced with a strong fibrous material, commonly glass fiber. While reinforcement with fibers, soon as glass fibers, yields a much more rigid plastic pipe and one capable of being used at much higher hoop stresses, other problems are introduced. Since fiber reinforced pipe is a multicomponent system, the manufacturer is faced by the problems associated with the incompatibility of the various components. These include, degradative chemical interaction, poor adhesion between fiber and resin, poor wettability of the fiber with the resin and the harmful influence of manufacturing conditions such as temperature and pressure on the components in the presence of each other. Often, the fibers must be pretreated to enhance adhesion with the resin. Other problems involve determining the most effective distribution of the fibers in the resin to give optimum properties to the resulting structure. The directional disposition of the fibers and the uniformity of fiber distribution in the resin matrix are very important factors in the ultimate performance of the resulting structure. Distribution problems may be simplified by using extremely fine denier and short length fibers (microfibers), but these fibers in the prior art are inherently too weak to withstand the pressures used in pumping fluids.

The problems described above, and others, lead to complexities and difficulties in the fabrication of fiber reinforced tubular structures, and are largely responsible for the high cost of such products. In use, fiber reinforced tubular structures are subjected to stresses and inequitable stress distributions not found in single component structures. For example, differences in the thermal coefficient of expansion between components lead to internal stresses. For glass fiber reinforced plastic pipe, the differences in thermal coefficients between glass and the plastic may range from 5:1 to 10:1. Also in use under pressure, the distribution of stress in glass reinforced fiber pipes is inequitable because of the widely differing tensile moduli of the components.

In Belgian Patent 568,524 a method for making plexifilaments is described. The plexifilaments are strands comprising three-dimensional networks of film-like elements. These film-like elements are very thin, being less than 4 microns thick and are connected at random intervals along and across the strands. In the same patent, microfoams with very thin filmy cell walls which are also less than 4 microns thick, are described.

One object of this invention is to provide a self-reinforced, tubular structure made from oriented film-like elements and having high strength, light weight, high rigidity and high resistance to mechanical damage.

Another object is to provide a simple and low cost method for making such self-reinforced pipe from film-like aggregates without the destruction of the film-like elements or of their orientation, and without use of bonding agents, or adhesives.

Another object is to provide a self-reinforced tubular structure, in which the oriented elements are bonded to one another without the use of chemical bonding agents or adhesives and without losing their film-like character or their molecular orientation. Such a tubular structure is free from inequitable distribution of mechanical and thermal stresses and is free from the chemical interaction and poor adhesion between components to which multicomponent or heterogeneous fiber reinforced tubular structures are subject.

It is a further object to provide a lined substantially self-reinforced tube which is leak-proof at very high pressures and which is very light in weight.

Other and further objects will appear in the course of the following description.

This invention comprieses wrapping a plurality of layers of an aggregate of crystalline planar oriented film-like elements in the form of sheets or strands around a mandrel or other form to prepare a hollow structure. After formation, the wall of the hollow structure is compressed by the application of internal and external pressure and the temperature is carefully adjusted to bond or weld the film-like elements together at their contact points without destroying the identity or the crystalline orientation of the film-like elements. The bonded tubular structure is characterized by light weight, high strength and high resistance to mechanical damage. The film elements used in the practice of this invention have an average thickness less than 4 microns and preferably less than 2 microns.

The aggregates of film elements which are used to make the tubular product may be in the form of a continuous integral strand comprising a three-dimensional network of film-fibrils or of cellular material in which the cell walls are extremely thin and the entire structure composed substantially of polyhedral cells having walls less than 4 microns thick. The film aggregates used for making the tube of this invention may also be used in sheet form. The sheets may be made by direct lay-down of plexifilaments on a moving belt or may be made by cutting and beating plexifilaments in aqueous suspension and forming sheets on a screen as in paper-making. The microcellular aggregates may, of course, be used as strands or as direct extruded sheets. In addition, they may be used in the form of wet-laid sheets prepared by beating the cellular materials in water and casting upon a screen.

Because of the extremely fine state of division of the elements which make up the aggregates of film material, the surface area of the aggregates is greater than 2 m.$^2$/g.

The invention will be described in more detail by reference to the figures which may be identified as follows:

FIGURE 1 is a view of the tube of this invention showing the filmy material 1 which is the principal constructional material in the tube.

FIGURE 2 is a spinneret and a deflector used in preparing film-fibril material used for making the tube.

FIGURE 3 shows a spinning system and continuous belt for collecting a sheet material used for making the tube.

Figure 4:
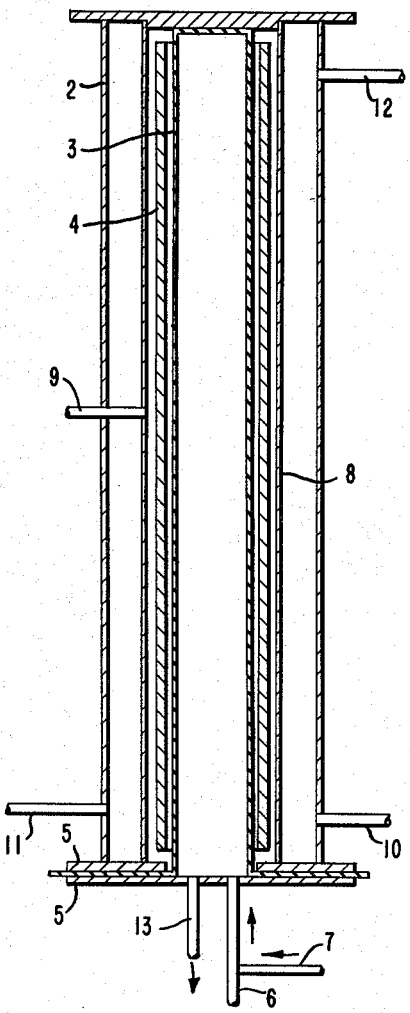
FIGURE 4 is a diagram of pipe-making apparatus wherein an expandable tube is provided for compressing the pipe wall.
Figure 5:
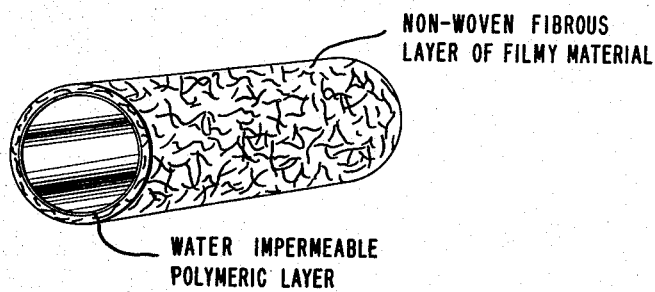
FIGURE 5 is a tube of the invention wherein an outer layer of filmy material, which is the principal constructional material in the tube, is provided on its inner surface with a continuous water-impermeable polymeric layer.

The fine film-like aggregates may be made from a variety of thermoplastic and heat-weldable plastic or resinous materials, but are preferably made of crystalline polymers. The crystallites in the film-like elements are planar oriented. This orientation can be detected by electron diffraction techniques using standard X-ray diffraction theory. Electron diffraction is used instead of X-ray diffraction in studying the film elements since the film elements are too thin to give dense X-ray diffraction spots. Examples of plastic materials suitable for use in the practice of this invention are, branched polyethylene, linear polyethylene, blends of the foregoing, polyethylene copolymers such as those from ethylene-isobutylene, ethylene-octene and ethylene-decene, and other thermoplastic materials such as polypropylene, poly(ethylene terephthalate), poly(hexamethylene adipamide) and the like which are thermoplastic and heat-weldabe or self-adhering when heated under pressure. Copolymers of at least 90% by weight ethylene and up to 10% of an α-olefin with 3 to 12 carbon atoms per molecule are particularly useful for preparing pipe with low growth under pressure.

In the practice of this invention, the pipe, tube, duct, container or like hollow or tubular structure is formed by wrapping a plurality of layers of a sheet material composed of film-fibril elements onto a suitable mandrel. The sheet may be wide or it may be in the form of a narrow tape. It has a basis weight in the range 1 to 20 oz./yd.$^2$, thickness of 20 to 200 mil, and a density between 0.15 and 0.6 g./cc. The sheet or strand may be wrapped helically or normal with respect to the axis of the mandrel depending on properties desired and use requirements. The wrapping or winding of the sheet into a tubular structure should be done under sufficient tension to give a compact material. Commercial equipment for forming tubular structures from sheets is readily available and many varieties exist. Examples of tube forming equipment may be found in the following patents: U.S. 2,336,540; U.S. 2,748,805; U.S. 2,731,070; U.S. 2,002,896; U.S. 2,033,717; and U.S. 2,589,041. The techniques for wrapping tubular structures from sheet material are old in the art.

After formation of the tubular structure by wrapping sheet material as described above, the unbonded tubular structure is subjected to internal and external pressure. While under pressure, heat is applied to the tubular structure and the temperature carefully adjusted to effect thermal bonding without loss of either the identity or orientation of the fine film elements composing the tubular structure. This heat-bonding or welding is carried out at temperatures near the polymer melting temperatures of the plastic. In no case should the temperature at the center of thickness of the pipe wall exceed the polymer melting temperature. Otherwise, the film elements will be completely de-oriented and the advantages of this invention will not be realized.

On the other hand, the temperature required for this heat-bonding must be high enough to (1) soften the outer film elements, and (2) effect a bonding or welding together of the inner film elements at their points of contact without destroying the fine films or their orientation. In general the surface temperature of the pipe wall will be between 25° C. under the melting point and 10° C. over the melting point. The wall temperature used for the heat-bonding step varies with the polymer from which the fine film-fibrils are made and must be determined for each heat-weldable polymer used. The time of exposure of the tubular structure to the heat-bonding temperature is a function of the rate of heat transfer, the thickness of the wall of the tubular structure and the method of heating, and must be determined for each plastic and method of heating used. In a process operating within the temperature limits specified above, the tubular material is heated between 0.1 and 30 minutes. It is preferred however, to operate with wall temperatures between 2° C. under the melting point and 10° above the melting point and with exposure times of less than five minutes.

The pressure employed during the heat-bonding depends on the heat-weldable plastic used for preparing the film elements and upon the degree of compaction or the density desired in the tubular structure. Pressures in the range of 20 to 100 p.s.i.g. have been found most suitable for preparing tubular structures from plexifilaments of linear polyethylene.

The tension applied to the sheet during wrapping or winding of the tubular structure and the pressure applied during heat-bonding, introduce stresses which help to maintain and can increase the orientation of the film elements used in the tube or pipe made by this invention.

Devices for applying pressure simultaneously to the inside and outside of a tubular or hollow structure are well known in the art. Among such commercial devices are those having a rigid shell with an inflatable or otherwise expandable mandrel, or a rigid mandrel with external pressure rollers to give the external pressure. Heat may be supplied in many ways such as by steam, or by electrical heaters. Suitable commercial equipment exists which could be utilized for a continuous process in which the wrapping and heat-bonding steps are integrated, permitting the production of continuous pipe.

After the heat-bonding step, the pipe, tube, container or like tubular structure is cooled to a temperature well below the heat-bonding temperature before the internal and external pressures are reduced. When cool, the pressure is reduced and the tube is removed from the mandrel. If the pressure is reduced before the tube or pipe is sufficiently cool, shrinkage or distortion may occur.

The tubular products of this invention can be made in diameters from ¼ inch to 4 feet but are preferably 2 to 18 inches in diameter. The wall thickness can be 10 mils to 1 inch, but is preferably between 30 mils and 200 mils. The wall of the finished uncoated pipe preferably has a density of 0.65 to 0.90 g./cc. and is extremely light in weight.

Despite the low weight per unit length the pipes of this invention have hoop strengths above 7,000 p.s.i., and in the preferred forms have hoop strengths of 13,000 p.s.i. to 40,000 p.s.i.

In general the uncoated pipe is very satisfactory for conveying low pressure fluids as in air ventilating systems or in the distribution of irrigation water. For certain uses where weeping at high pressure is to be avoided, the pipe may be lined on the inside with a continuous thin layer of polymeric material. The pipe also may be coated on the exterior. In general it is not necessary to have more than 25% by weight of lining or coating material on the finished pipe. A variety of water impermeable resins may be used for this purpose. Branched chain polyethylene is preferred, however, for the liner and coating. The outside coating may contain an ultraviolet screener, carbon black, pigments, or other fillers.

The lined pipe is completely leak-proof at water pressures of 200 p.s.i. and higher.

A pipe of particularly high strength may be prepared by stretching the circumference 10 to 50% during the process of manufacture. Still higher strength may be obtained by stretching the sheet product 10 to 100% in the lengthwise direction before using the sheet in pipe manufacture.

In pipe or tubes made from plexifilamentary sheet the maximum hoop strength is obtained when more than 60% of the film-fibril elements in the finished pipe are oriented within 45° of the circumferential direction.

While a wide variety of oriented polymeric materials may be used in the film elements of this invention, polyhydrocarbons are preferred, and linear polyethylene is especially preferred.

In the following examples which illustrate the invention, melt index of the polymer is determined by the ASTM Method D–1238–57T, Condition E. The melt index is a measure of flowability for the molten polymer (grams per ten minutes) and is inversely related to molecular weight. The term "linear polyethylene" in the specification refers to polyethylene having densities of 0.94 to 0.98 g./cc., but preferably having densities of 0.95 or higher.

EXAMPLE I

A non-woven plexifilamentary sheet weighing about 2 oz./yd.$^2$ was prepared by flash extrusion of a solution of linear polyethylene in methylene chloride. Referring to FIGURE 3 an autoclave 101 was charged with 293 lbs. of dry methylene chloride, 35 lbs. of linear polyethylene having a density of 0.959, melt index of 1.04 (and containing 39 p.p.m. of Santowhite+), and an additional 14.3 grams of Santowhite was added to the autoclave to obtain an over-all antioxidant concentration of 1,000 p.p.m. This mixture was heated and agitated for approximately 2½ hours to obtain a solution temperature of 214° C. at an autogenous pressure of 660 p.s.i. Nitrogen was then added to the autoclave over the solution from a pressure tank 113 and mixed into the solution to obtain an equilibrium pressure of 730 p.s.i. Agitation was then stopped and additional nitrogen was added to bring the total pressure to 800 p.s.i. in the atmosphere over the solution which was held at a temperature of 217° C. A valve 114 was then opened and the solution was then passed through a transfer line 102 to a filter 103 and then to dual side-by-side spinneret assemblies 110. Within each spinneret assembly the solution passed through a 0.035-inch diameter preflash orifice 20 at 800 p.s.i. as shown in FIGURE 2. Finally, it passed through holes .031-inch in diameter and .031-inch in length 21 into the surrounding atmosphere.

Plexifilamentary strands were formed at the orifice exit and were extruded at high velocity. The strands impinged against a concave deflector 22 shown in FIGURE 2. The strand was spread out by the impact and by the rapid evaporation of solvent to many times its original diameter, giving thereby a wide three-dimensional network of film-fibrils 106 as shown in FIGURE 3.

Approximately 3 inches below the spinneret and 1 inch from the spinning web, the web passed through a 45 kv. electrostatic field induced through the rake-like bar 107. The field served to increase filament separation and improve pinning of the web to an endless neoprene belt 108, located 26 inches below the spinneret and moving at 15 feet per minute. A ground plate 109 located immediately under the neoprene belt guided the yarn by attraction during the deposit. The web was traversed in the cross-belt direction at 500 cycles/minute by oscillation of the deflector, the included angle of oscillation being about 22°. This traversing action enhanced a natural tendency of the yarn to deposit randomly on the belt.

---
+ Trade name for 4,4-butylidene-bis(6-tertiary-butyl-m-cresol).

The deposited yarn was then removed from the lay-down area by the moving belt, passed under the static dissipator 111 located over the belt and through a pressure roll 112. The resulting sheet weighed 2 oz./yd.$^2$ and had a density of 0.39 g./cc. The sheet was composed of web-like strands which were three-dimensional networks of film-fibrils. The film-fibrils were less than 4 microns thick, were crystalline, and had an electron diffraction orientation angle less than 90°. The sheet material had a surface area of at least 2 m.$^2$/g. Roll 115 is a wind-up.

The plexifilamentary sheet was trimmed to form a continuous strip 21 inches wide. The strip was wound around a mandrel with the axis of the strip at right angles to the mandrel axis. A tube several layers deep was formed on the mandrel. The soft tube had an inside diameter of 2.26 inches and an outside diameter of 2.66 inches. After winding, the tube was moved intact from the mandrel and was placed in a steam jacketed cylinder 2 as shown in FIGURE 4. An expandable rubber tube 3 was then inserted in the plexifilamentary tube 4. The expandable rubber tube was made air tight by fastening it between flanges 5 of the jacketed pipe, which was in turn connected to a steam line 6 and also to an air line 7. Air pressure (35 p.s.i.g.) was next applied to the rubber tube through the air supply pipe 7 causing the rubber tube to expand and causing the wrapped film-fibril tube to be pressed against the side walls of the cylinder 8. Vacuum was next applied to the space outside the plexifilamentary tube by way of vacuum pipe 9 to remove air entrapped in this annular space and in the interstices between the film-fibrals of the wrapped tube. After evacuation of the air space around the wrapped tube, the air pressure within the expandable tube was released through the air supply pipe 7. Steam was then supplied to the jacketed cylinder through inlet 12 and to the inside of the expandable rubber tubing diaphragm through inlet 6. The steam pressure was controlled to give a pressure on the wrapped fibrous tube of 32 to 33 p.s.i.g. and a temperature of 135°–137° C. The condensate was passed through traps in outlet pipes 10 and 13. Under these conditions of pressure and temperature, the fine fibers in the tube were heat-welded together at their cross-over points without destruction of the fibers or of their orientation. Heat and pressure were applied for 20 minutes, then the steam supply was turned off, 35 p.s.i.g. air was applied to the inside of the rubber tube, and cold water introduced through pipe 11 into the jacket of the cylinder. Cooling was carried out under pressure to prevent the bonded tube from shrinking. After the mold became cool, air pressure was released and the finished tube was removed from the mold. During the heat-bonding step a consolidation occurred and the outside layers stretched transversely 11.4% while the inner layers were stretched 24.6% transversely. The wall thickness of the film-fibril tube was reduced from about 0.200 inch to 0.055 inch, the final outside diameter being about 2.97 inches. Properties of this tube and of other non-coated tubes are shown in Table I.

Example II

A self-reinforced, film-fibril tube or pipe was made by the procedure described in Example I except for the two following differences. The non-woven, unbonded, plexifilamentary sheet was made of linear polyethylene of a higher melt index than that used in Example I (1.74 vs. 1.04). Further, the heat-bonding time, that is, the time during which the tube was kept under bonding conditions (32–33 p.s.i.g. pressure and 135–137° C.) was reduced from 20 minutes to 10 minutes.

EXAMPLE III

An autoclave was charged with 277 lbs. of dry methylene chloride, 35 lbs. of linear polyethylene polymer having a melt index of 1.22 and 22.3 grams of Santowhite. The mixture was heated and agitated 2½ hours to obtain a solution temperature of 218° C. at an autogenous pressure of 742 p.s.i. Nitrogen was then added to the autoclave and mixed into the solution to obtain an equilibrium pressure of 1100 p.s.i. at a solution temperature of 218° C. The solution was passed through a transfer line, through a filter, through a 0.21" diameter orifice at 1100 p.s.i., 218° C. The yarn was collected from the orifice as a tow by allowing it to blow into a perforated metal can. The tow had a denier of 4745, was highly fibrillated, and had a plexifilamentary structure consisting of fine fibrils of less than 4 microns in thickness.

The tow was spirally wound on a mandrel about 2 feet long with an angle of wrap of approximately 60° with respect to the axis. When the spiral wrapping reached the end of the mandrel its direction of traverse was reversed and a spiral was again wrapped at an angle of 60° giving thereby a crisscross pattern. This method of wrapping was continued with a slight progression of the spiral wind until all parts of the mandrel were covered and the wall thickness of the wrapping was 0.2 inch. The resulting fibrous tube had an inside diameter of 2.26 inches and an outside diameter of 2.66". After winding, the tube was placed in a steam-jacketed cylinder which served as a mold and the same procedure followed from here on as that described in Example I.

Examples IV, V and VI describe tubes of types well known in the pipe-making art.

EXAMPLE IV

A polyethylene pipe was prepared by extruding the molten linear polyethylene (density 0.95 g./cc.) polymer through an annular orifice. The properties of this pipe and of other pipes is shown in Table I.

EXAMPLE V

An oriented extruded pipe was prepared as in Example IV, but the material was drawn axially and at the same time was inflated while still semi-molten to provide additional orientation in the pipe wall.

EXAMPLE VI

A fibrous tube was made from conventional melt-spun drawn linear polyethylene filaments of round cross-section. Filaments of 15 denier were cut into ½-inch staple length. The staple fibers were dispersed in water and processed to a non-woven sheet by use of a screen and hand sheet methods known in the paper-making art. The non-woven sheet was then wrapped and pressed for five minutes on a mandrel at 30 p.s.i. and 135° C. The inferior hoop stress at failure of this fibrous pipe compared to film-fibril pipes of this invention is illustrated in Table I.

EXAMPLE VII

A lined pipe or tube was formed by wrapping two layers of an 8 mil linear polyethylene film on a mandrel, after which a plurality of layers of non-woven, unbonded plexifilamentary sheet similar to that of Example I was wound over the linear polyethylene film to the same diameter as that of the tube of Example I. After thus forming a lined tube, the structure was heat-welded together under the conditions and in the apparatus described in Example I. The properties of this and other coated pipes of the invention are given in Table II. The most significant improvement over the uncoated pipe is the ten-fold increase in leak pressure.

EXAMPLE VIII

A self-reinforced, fibrous pipe was made by carrying out the process described in Example I, using a plexifilamentary sheet made of linear polyethylene of melt index 1.74. After wrapping and heat-bonding according to the instructions in Example I, the bonded fibrous pipe was lined with a polyurethane resin as follows: A 20% solution of polyurethane resin (EDC-145, as specified in Du Pont Elastomers Department Paint Bulletin No. 4) in methylene chloride was applied to the inner surface of the bonded, linear polyethylene film-fibril pipe by brushing. The polyurethane resin used for this coating was prepared from 1 mole of polypropylene ether glycol (MW 1000)
1 mole of 1,3-butanediol
2 moles of 1,1,1-trimethylolpropane
8 moles toluenediisocyanate After the pipe had been coated the solvent was allowed to evaporate at room temperature, leaving a thin (about 1–5 mil) polyurethane lining in the pipe. As shown in Table II this lined pipe had greatly improved ability to hold high pressure water compared to unlined film-fibril pipe.

EXAMPLE IX

A pipe having chlorosulfonated polyethylene as a lining was prepared using the plexifilamentary sheet described in Example I. The lined pipe was made by first winding a film of chlorosulfonated polyethylene (6 mil thick) around a mandrel similar to the one used in Example I. A piece of film about 2 feet in width was wrapped around the pipe in a direction at right angles to the pipe axis. One wrap around the pipe was used with enough overlap to give a good seal upon heating (about one-half inch). Then a plexifilamentary non-woven sheet weighing about 2 oz./yd.$^2$ and having a melt index

*Table I*

PROPERTIES OF UNCOATED PIPES MADE FROM VARIOUS FORMS OF LINEAR POLYETHYLENE

| Ex. | Material used | Wall[1] thick., in. | Weight lbs./ft. | Bursting pressure, p.s.i.g. | Hoop stress at failure (p.s.i.) | Density of wall, g./cc. |
|---|---|---|---|---|---|---|
| I | Film-fibril sheet | .055 | .22 | 600 | 16,200 | .85 |
| II | ____do____ | .086 | .27 | 675 | 11,800 | .75 |
| III | Film-fibril strand | .047 | .16 | 519 | 16,391 | .75 |
| IV | Extruded tube | .297 | 1.14 | 600 | 3,000 | .94 |
| V | Oriented extruded tube | .183 | .71 | 600 | 5,000 | .95 |
| VI | Wet-laid sheet, round filament | .322 | 1.19 | 600 | 2,770 | .91 |

[1] The outside diameter of all the pipes was 3.0 inches.

As illustrated in Table I all of the sheets composed of film-fibril elements (i.e. the sheets of Examples I and II and III) had very high hoop strength and at the same time had very low weight per linear foot. The table also shows the high strength of the products of this invention even in pipes with extremely low wall thickness. The hoop strength was measured according to the incremental pressure test, ASTM method D-1599-58T.

In Examples VII to XI various forms of lined or coated film-fibril pipes are described.

of 0.48 was wrapped in the same direction around the mandrel until several layers had been applied. The thickness of the material on the mandrel after wrapping was about 0.2 inch. The soft tube was removed from the mandrel and placed in the steam jacketed cylinder of FIGURE 4. The process of forming the pipe was then continued as in Example I. The resulting tube had a wall thickness of .070 inch and had exceptionally high hoop strength (greater than 18,800 p.s.i. at burst). The smooth inner wall of the pipe was impervious to water and prevented leakage of the pipe at pressures up to 890 p.s.i. Other properties are shown in Table II.

EXAMPLE X

A pipe similar to the one of Example IX was made using a branched chain polyethylene for the liner instead of chlorosulfonated polyethylene. A film (6 mil thick) of branched polyethylene (density 0.92 g./cc.) was wrapped in a direction normal to the pipe axis. One layer of this film was applied to the mandrel with a small overlap. Several layers of a plexifilamentary sheet weighing 3 oz./yd.$^2$ were wrapepd around the mandrel. The plexifilamentary sheet had a melt index of 0.48 and consisted of overlapping layers of strands comprising three-dimensional networks of film-fibrils. These film-fibrils join and separate at random intervals along and across the strand. The film-fibrils had an electron diffraction angle less than 55°.

After the soft film-fibril tube had been formed, the pipe was heated, pressed, and formed as in Example IX. The wall thickness of the finished pipe was 0.073 inch. The properties of the pipe are shown in Table II.

EXAMPLE XI

A pipe similar to that described in Example X was made by a similar process having both an inner and an outer lining of branched polyethylene. The inner lining consisted of a 6 mil layer of branched polyethylene film. The outer layer consisted of a 6 mil thick polyethylene layer loaded with carbon black. The carbon black filler increased the resistance of the pipe to deterioration in sunlight. The resulting pipe had essentially the same tensile properties as the lined uncovered pipe, was very light in weight, and retained its desirable tensile properties when exposed to sunlight. This pipe because of its light weight and sunlight resistance is especially useful in irrigation projects.

Pipe similar to the covered and/or lined pipes of the above examples can, of course, be made from sheet by well-known spiral wind methods. In this process, a spiral wrap angle of about 54° relative to the pipe axis is preferred.

EXAMPLE XII

A plexifilamentary sheet of linear polyethylene weighing 3 oz./yd.$^2$ was prepared as in Example I. The melt index of the polyethylene before spinning was 0.59 and in the sheet was 0.72. The sheet was stretched in a separate operation 87½% by passing through a pair of nip rolls heated to 153° C. at 8 feet/minute. The sheet was wound up on another roll at 15 feet/minute. The stretched sheet weighed 1.6 oz./yd.$^2$. Its tensile strength was 41.5 lb./in./oz./yd.$^2$ and the break elongation was 9%.

A tube was made from the stretched sheet using the equipment of Example I. The mandrel was first wrapped with a layer of 6 mil chlorosulfonated polyethylene film then several layers of plexifilamentary sheet were wound onto the film material. The resulting product had a diameter of 2.97 inches, a thickness of .060 inch and weighed 0.199 lb./foot. The wall material weighed 36.7 oz./yd.$^2$ and the density was 0.85 g./cc. This tube had remarkably high strength. The pressure at burst was 990 p.s.i. and the hoop strength was 24,503 p.s.i.

The products of this invention have obvious utility in conveying liquids, gases an dair-borne or pneumatically conveyable solids. Examples of applications for the products of this invention include the following.

> Home water lines
> Rural water lines
> Irrigation tubing
> Industrial water lines
> Soil drainage pipe
> Sewer pipe
> Chemical process piping
> Salt water lines
> Ventilation ducts and tubing
> Air conditioning ducts
> Pneumatic conveyer tubing It is also apparent that the products of this invention can be used for containers for chemicals, shipping drums, food packages, such as milk containers, tanks, pressure vessels and cores for winding sheet materials such as fabric or paper.

Another common application for tubing is as protection or insulation of other tubular apparatus. It is obvious that the products of this invention can be used for purposes such as the following:

> Covering for electric power and communication cables
> Thermal insulation for piping
> Thermal insulation for tanks
> Mechanical protection for glass equipment Further, the tubular structures of this invention can be used for structural purposes, such as in tubular furniture, scaffolding, pillars and light weight theater scenery.

Common additives such as fillers, dyes, pigments, antioxidants, carbon black, reinforcing particles, adhesion promoters, removable particles, ion exchange materials, and U.V. stabilizers may be mixed with the polymer solution prior to extrusion. In addition, these materials may be added to the coating materials used on the outside of the pipe or on the inside.

*Table II*
PROPERTIES OF COATED PIPE*

| Example No. | Melt index of film-fibril sheet | Lining material (thickness) | Wall thickness, mils | Pipe weight | | Density, g./cc. | Pressure tests, p.s.i.g. | | Hoop stress at burst, p.s.i. |
|---|---|---|---|---|---|---|---|---|---|
| | | | | Lbs./ft. | Oz./yd.$^2$ | | Leak | Failure | |
| VII | 2.1 | Linear polyethylene film (16 mil) | .083 | .26 | 48 | .77 | 250 | 400 | **7,400 |
| VIII | 1.74 | Polyurethane resin | .086 | .27 | 48 | .75 | 400 | 675 | 11,800 |
| IX | .48 | Chlorosulfonated polyethylene film (6 mil). | .070 | .205 | 39 | .75 | 890 | 890 | **18,800 |
| X | .48 | Branched polyethylene film (6 mil) | .073 | .236 | 45 | .88 | 870 | 870 | 17,700 |
| I | 1.04 | Unlined | .055 | .22 | 42 | .85 | 25 | 600 | 16,200 |

*Outside diameter for all pipe was 3.0 inches.
**Pipe did not burst, and will fail at still higher pressure.

What is claimed is:
1. A tubular fluid conduit having walls formed of a wound coherent aggregate of plexifilamentary material, said material being composed of networks having a surface area greater than 2 m.$^2$/g. and comprising a three-dimensional integral plexus of synthetic organic, crystalline polymeric, fibrous elements, said elements being coextensively aligned with the network axis and having the structural configuration of oriented film-fibrils, an average film thickness of less than 4 microns and an average electron diffraction orientation angle of less than 90°; within said walls the fibrous elements being heat-welded and compacted together at their cross-over points but retaining their said orientation at the center of thickness of the walls, the density of said walls being 0.65 to 0.90 g./cm.$^3$.

2. A tubular fluid conduit according to claim 1 wherein said coherent aggregate comprises a nonwoven sheet formed of at least one continuous strand of said plexifilamentary material.

3. A tubular fluid conduit according to claim 1 having a hoop stress at burst of at least 7,000 p.s.i.

4. A tubular fluid conduit according to claim 1 having a hoop stress at burst of at least 13,000 p.s.i.

5. A tubular fluid conduit according to claim 1 wherein said polymeric fibrous elements are composed of polyethylene.

6. A tubular fluid conduit according to claim 1 wherein there is adhered to the inner surface thereof a continuous water-impermeable polymeric layer, said polymeric layer comprising less than 25% of the total weight of the fluid conduit.

References Cited by the Examiner
UNITED STATES PATENTS

| | | | |
|---|---|---|---|
| 2,941,915 | 6/60 | Manning | 156—433 XR |
| 2,977,269 | 3/61 | Nerwick | 156—285 |
| 2,982,667 | 5/61 | Ness et al. | 156—299 XR |
| 2,999,788 | 9/61 | Morgan | 154—46 |
| 3,003,304 | 10/61 | Rasmussen | 161—59 XR |
| 3,017,309 | 1/62 | Crawford et al. | 156—229 XR |
| 3,081,519 | 3/63 | Blades et al. | 161—177 XR |
| 3,083,130 | 3/63 | Strandquist | 156—184 XR |
| 3,093,532 | 6/63 | Miller et al. | 156—430 |

FOREIGN PATENTS

| | | |
|---|---|---|
| 568,524 | 12/58 | Belgium. |
| 874,221 | 8/61 | Great Britain. |

EARL M. BERGERT, *Primary Examiner.*